United States Patent
Hagen et al.

(10) Patent No.: US 12,117,562 B2
(45) Date of Patent: Oct. 15, 2024

(54) SURROUNDINGS SENSOR WITH A MOVABLE SENSOR UNIT FOR MOTOR VEHICLES

(71) Applicant: Covestro Intellectual Property GmbH & Co. KG, Leverkusen (DE)

(72) Inventors: Rainer Hagen, Leverkusen (DE); Thomas Grimm, Cologne (DE); Ulrich Grosser, Kürten (DE); Alexander Meyer, Düsseldorf (DE); Andreas Klein, Leverkusen (DE); Dirk Hinzmann, Pulheim (DE); Peter Capellen, Krefeld (DE); Rafael Oser, Krefeld (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 777 days.

(21) Appl. No.: 17/282,815

(22) PCT Filed: Oct. 4, 2019

(86) PCT No.: PCT/EP2019/076921
§ 371 (c)(1),
(2) Date: Apr. 5, 2021

(87) PCT Pub. No.: WO2020/074391
PCT Pub. Date: Apr. 16, 2020

(65) Prior Publication Data
US 2021/0389435 A1 Dec. 16, 2021

(30) Foreign Application Priority Data
Oct. 10, 2018 (EP) .................................... 18199529

(51) Int. Cl.
*G01S 7/481* (2006.01)
*G01S 7/02* (2006.01)
(Continued)

(52) U.S. Cl.
CPC ............ *G01S 7/4813* (2013.01); *G01S 7/027* (2021.05); *G01S 7/4039* (2021.05); *G01S 7/497* (2013.01);
(Continued)

(58) Field of Classification Search
None
See application file for complete search history.

(56) References Cited

U.S. PATENT DOCUMENTS

| 6,573,860 B1 | 6/2003 | Winter et al. |
| 6,691,003 B1 | 2/2004 | Stortz et al. |

(Continued)

FOREIGN PATENT DOCUMENTS

| DE | 10151979 A1 * | 4/2003 | ........... G01S 7/4813 |
| DE | 202006014925 U1 | 12/2006 | |

(Continued)

OTHER PUBLICATIONS

International Search Report, PCT/EP2019/076921, date of mailing: Dec. 13, 2019, Authorized officer: Jan van Norel.

*Primary Examiner* — Vladimir Magloire
*Assistant Examiner* — Eric K Hodac
(74) *Attorney, Agent, or Firm* — John E. Mrozinski, Jr.

(57) ABSTRACT

The invention relates to a sensor system (200, 300, 400) for a motor vehicle, comprising a sensor housing and an active or passive sensor (102) arranged therein and held on a movable sensor holder (201, 401), having a sensor technology based on radiation detection and a measurement apparatus assigned to the sensor (102) and a control apparatus, coupled to said measurement apparatus, for the sensor holder (201, 401), wherein the sensor housing has a cover (106, 301) that is signal-transmissive for the sensor (102) on its side located in the detection direction of the sensor (102), and wherein the detection range (108, 109) of the sensor
(Continued)

(102) in the region of the signal-transmissive cover (106, 301) has a lower extent than the signal-transmissive cover (106, 301), wherein the sensor system (200, 300, 400) is characterized in that the measurement apparatus is designed such that it is suitable for checking, in the detection range of the sensor (102), whether and in which section the signal-transmissive cover (106, 301) has a region with reduced signal transmissivity (202), wherein the measurement apparatus interacts with the control apparatus in such a way that the control apparatus is able to change the position of the sensor (102) in such a way that the region with reduced signal transmissivity (202) lies outside the detection range (108, 109) of the sensor (102). The invention furthermore relates to a method for operating such a sensor system (200, 300, 400) and to a motor vehicle that is equipped with such a sensor system (200, 300, 400).

4 Claims, 4 Drawing Sheets

(51) Int. Cl.
    *G01S 7/40*     (2006.01)
    *G01S 7/497*     (2006.01)
    *G06F 18/25*     (2023.01)

(52) U.S. Cl.
    CPC ...... *G06F 18/25* (2023.01); *G01S 2007/4975* (2013.01)

(56) References Cited

U.S. PATENT DOCUMENTS

| | | | |
|---|---|---|---|
| 7,602,477 B2 | 10/2009 | Nakamura et al. | |
| 11,536,593 B1 * | 12/2022 | Wolf | B60R 19/483 |
| 2010/0235129 A1 | 9/2010 | Sharma et al. | |
| 2015/0090291 A1 | 4/2015 | Na et al. | |
| 2017/0315210 A1 | 11/2017 | Oba | |
| 2018/0004170 A1 * | 1/2018 | Ko | G01S 7/4817 |

FOREIGN PATENT DOCUMENTS

| | | | | |
|---|---|---|---|---|
| DE | 20221683 U1 * | 1/2007 | ........... | G01S 7/4813 |
| DE | 102010055113 A1 | 7/2011 | | |
| DE | 102012025467 A1 * | 7/2014 | ........... | G01N 21/538 |
| DE | 102013207482 A1 | 10/2014 | | |
| EP | 1980874 A2 | 10/2008 | | |
| JP | 2005329779 A | 12/2005 | | |
| JP | 2016183877 A | 10/2016 | | |
| JP | 2016223886 A | 12/2016 | | |

* cited by examiner

SURROUNDINGS SENSOR WITH A MOVABLE SENSOR UNIT FOR MOTOR VEHICLES

CROSS-REFERENCE TO RELATED APPLICATION

This application is a national stage application under 35 U.S.C. § 371 of PCT/EP2019/076921, filed Oct. 4, 2019, which claims the benefit of European Application No. 18199529.1, filed Oct. 10, 2018, each of which is incorporated herein by reference.

DETAILED DESCRIPTION OF THE INVENTION

The invention relates to a sensor system for a motor vehicle comprising a sensor housing and an active or passive sensor arranged therein and held on a movable sensor holder with sensor technology based on radiation or sound wave detection as well as a measuring device associated with the sensor and a control device, coupled to said measuring device, for the sensor holder, wherein the sensor housing has a signal-transmissive cover for the sensor on its side located in the detection direction of the sensor and wherein the detection area of the sensor in the area of the signal-transmissive cover has a smaller extent than the signal-transmissive cover. The invention further relates to a method for operating such a sensor system as well as a motor vehicle which is equipped with such a sensor system.

Driver assistance systems are equipment in motor vehicles designed to increase driving comfort and safety. Advanced driver assistance systems even enable highly automated and autonomous driving. In such semi-autonomous and fully autonomous vehicles, particularly high demands are placed on the function of the environmental sensors. They are based, for example, on digital camera, radar and lidar technology. Cameras are compact optical systems with photocells that capture high-resolution images of the environment. Radar (Radio Detection and Ranging) and Lidar sensors (Light Detection And Ranging), also known as Ladar (Laser Detection and Ranging), together with the cameras and possibly other sensor types, form a digital sensor network based on data fusion and high signal redundancy. Through precise object recognition, object classification and the generation of digital environmental maps in real time, the sensor system makes safe autonomous driving possible in different driving, road, and weather conditions.

Functioning, fail-safe sensors are the basic prerequisite for semi-autonomous and fully autonomous driving. An essential technical task is to maintain the function of the sensor, which sits behind a sensor protection cover that is soiled or damaged by weather and usage effects.

Fouling is caused, for example, by stubborn dust, insects, bird droppings, slush, dried-on dirty water, as well as any kind of particles or liquids swirled up from the road. Fouling can also be caused by dust, as well as any kind of particles or liquids that are stuck to the inside of the sensor protection cover. Damage to the sensor protection cover includes, for example, abrasion, scratches, erosion, cracks, chippings, deformation, swelling, turbidity, and discoloration, either in the flat cover of the body of the pane itself or in at least one of its components, for example lacquer layer, adhesive layer, or decorative element. Fouling and damage cause the electromagnetic waves to be detected by the sensor, as well as the emitted waves (depending on the type of infrared light, radio, or microwave) to be attenuated or deflected by absorption, reflection, or dispersion. This can lead to different faulty sensory behavior, in particular partial to complete signal failure, loss of sensor area, loss of positional resolution, errors in object detection and speed vectoring.

In the prior art, measures are taken to clean dirty sensor covers. Thus, DE 10 2010 055 113 A1 describes a cleaning device with at least one spray nozzle, which sprays a cleaning liquid at high pressure onto at least one of the sensor protection covers and in combination with a heater for the liquid achieves a high cleaning performance even at cold temperatures.

In US 2015/0090291, additional wipers are described, which can clean the pane in front of the sensor.

In DE 10 2013 207 482 A1, heatable surface elements are described, which are used in particular for heating radar covers. By heating up the cover, dirt and coverings of ice and snow can be thawed, and moisture can be reduced, resulting in improved transmissivity of the radar waves.

In the prior art, software-based solutions for dealing with signal loss can be found in so-called blind sensors, or with unclear sensor signals. US 2010/0235129 describes the correlation of signals from multiple sensors (sensor fusion), which allows the autonomous operation of a vehicle to be maintained even in the absence of non-assignable or inconclusive sensor signals.

DE 199 45 268 A1 describes a similar procedure and a device for detecting the sensor state with regard to contamination and blindness. These are cost-effective solutions because they are part of the electronic sensor intelligence.

In the prior art there is no teaching about dealing with the internal sensor correction of faults as a result of normal wear and tear of the sensor protection cover or other damage to it caused by external mechanical or weather-related action. The examples of sensor intelligence and sensor fusion cited can only eliminate the effect of signal loss in the sensor network, but not the cause of the signal failure, and thus an increased safety risk associated with autonomous driving remains.

The object of the present invention thus consisted in providing a sensor system for a motor vehicle, which in the event of contamination affecting the functioning of the sensor or locally limited damage to the sensor protection cover is automatically able to restore the functioning of the sensor without the sensor having to be replaced or repaired for this. In other words, it is an essential concept of the invention to fix transmitters and/or receivers on a movable unit and to specifically reorient said unit in the event that a defect disturbs the incoming and/or outgoing signals so that the corresponding signal is directed past the defect.

The movable unit according to the invention thus serves in particular to reorient the respective component—transmitter and/or receiver—within the housing module such that it is possible, by means of a targeted lateral displacement and/or rotation, a) to send emitted signals through the sensor protection cover at another, defect-free location or
b) to position the receiver such that it can detect incoming signals without interference.

The movable unit according to the invention is designed for example as a mechanical displacing or rotating unit, which in a preferred embodiment is fixedly connected to the housing module.

The object was achieved in the case of a sensor system of the type mentioned at the beginning by the sensor being movably held and coupled to a measuring device in such a way that, in the case where damage is detected, the sensor can be moved by means of a control device to another position, in which the sensor can operate outside the area of influence of the damage.

The invention thus relates to a sensor system for a motor vehicle comprising a sensor housing and an active or passive sensor arranged therein and held on a movable sensor holder with sensor technology based on radiation detection as well as a measuring device associated with the sensor and a control device, coupled to said measuring device, for the sensor holder, wherein the sensor housing has a signal-transmissive cover for the sensor on its side located in the detection direction of the sensor and wherein the detection area of the sensor in the area of the signal-transmissive cover has a smaller extent than the signal-transmissive cover, wherein the sensor system is characterized in that the measuring device is designed in such a way that it is suitable to check in the detection area of the sensor whether and in which section the signal-transmissive cover has an area with reduced signal transmissivity, wherein the measuring device cooperates with the control device in such a way that the control device can change the position of the sensor in such a way that the area with reduced signal transmissivity is outside the detection area of the sensor.

According to a preferred embodiment of the sensor system according to the invention, the sensor is selected from radar sensors, light sensors, in particular lidar sensors based on lasers or light-emitting diodes and image acquisition sensors, as they are used for example in reversing, front or environment cameras.

The sensor can have a transmitting device and a separate receiving device, wherein the transmitting device and/or the receiving device is fixed to the movable sensor holder or the transmitting device and the receiving device are each separately fixed to movable sensor holders. The sensor holder is preferably designed to be movable in all spatial directions, and rotatable and/or tiltable about all axes. This allows the system to be adjusted very flexibly to bypass areas with reduced signal transmissivity and to maintain the function of the sensor.

The movement of the sensor holder can be carried out, for example, by at least one of an electric motor, a piezoelectric element, or a hydraulic element assigned to the sensor holder. The sensor holder may further be fixed to the sensor housing, in particular on the area of the sensor housing opposite from the signal-transmissive cover. The fixing does not keep the sensor stationary but is designed in such a way that it allows the aforementioned possibilities of adjustability. In particular, the movement of the sensor holder by a belt drive, in particular a V-belt drive, a sliding carriage, a rotary device, such as a rotary plate or also in a gimbal suspension, can be carried out by means of suitable drives.

The check of whether and in which section the signal-transmissive cover has an area with reduced signal transmissivity may in principle be carried out in any manner known to the person skilled in the art for this purpose, preferably by means of a computing unit assigned to the measuring device. For this purpose, the computing unit can be designed with a data processing program, by means of which the check of whether and in which section the signal-transmissive cover has an area with reduced signal transmissivity can be carried out by differential image recognition using the same sensor or different sensors, wherein in particular sensor fusion is used with the use of different sensors. A suitable method for sensor fusion is disclosed, for example, in US 2010/0235129 A.

Preferably, the control device is designed in such a way that after a change of position of the sensor it passes this new position to the on-board network of the vehicle, so that a conversion of the data supplied by the sensor can be carried out there in such a way that the new sensor position is included as a correction variable compared to the original sensor position. The conversion of the new position can also be carried out in the computing unit of the sensor system, so that position-corrected signals can already be sent from the sensor system to the on-board network of the vehicle.

The measuring device and the control device can be positioned mutually independently inside or outside the sensor housing. In some cases, it may be preferred to arrange the measuring device and the control device within the sensor housing because this makes the entire unit one component and apart from the energy supply and the connection to the data network of the vehicle no additional lines which could possibly lead to leakage problems have to be passed through the sensor housing.

According to a preferred embodiment of the sensor system according to the invention, the measuring device is designed so that it can output an error signal in the event that the position of the sensor cannot be changed in such a way that the area with reduced signal transmissivity is outside the detection area of the sensor. This error signal may be forwarded to the on-board electronics of the vehicle, where it may trigger an error code indicating the need to replace the sensor and/or its improper functioning so that the vehicle user does not rely on a defective sensor and there is thus damage to the vehicle or the like.

The sensor system is further preferably designed in such a way that the check of whether and in which section the signal-transmissive cover has an area with reduced signal transmissivity can be carried out when switching on the sensor system and/or at freely selectable time intervals. This ensures that the sensor is checked at regular intervals and that its functionality is ensured.

The sensor system according to the invention may further be designed so that a signal-transmissive inner protective cover which preferably extends to the lateral inner walls of the housing cover is provided between the sensor and the signal-transmissive cover. In this way, the internal sensor can remain protected from harmful influences even if the signal-transmissive cover has a crack or a hole, for example.

The signal-transmissive cover and/or the signal-transmissive inner protective cover may be constructed of a transparent plastic or glass, wherein the transparent plastic is in particular selected from polycarbonate, polymethyl methacrylate, polyethylene terephthalate, cellulose triacetate, amorphous polyamide, cycloolefin polymer, cycloolefin copolymer, polyethylene, polypropylene, polyvinyl alcohol or from mixtures or copolymers thereof. Particularly preferred here due to their optical and mechanical properties are polycarbonate and polymethyl methacrylate, especially polycarbonate because of the extremely tough behavior.

Another object of the present invention relates to a method for operating a sensor system for a motor vehicle comprising a sensor housing and an active or passive sensor arranged therein and held on a movable sensor holder with sensor technology based on radiation detection as well as a measuring device associated with the sensor and a control device, coupled to said measuring device, for the sensor holder, wherein the sensor housing has a signal-transmissive cover for the sensor on its side located in the detection direction of the sensor and wherein the detection area of the sensor in the area of the signal-transmissive cover has a smaller extent than the signal-transmissive cover, wherein the method is characterized in that the measuring device is used to check whether and in which section of the detection area of the sensor the signal-transmissive cover has an area with reduced signal transmissivity, and if an area with reduced signal transmissivity is detected, the position of the sensor is changed by means of the control device in such a way that the area with reduced signal transmissivity is outside the detection area of the sensor.

According to a preferred development of the method according to the invention, an area with reduced signal transmissivity is defined in that attenuation of the signal to be detected by the sensor technology of at least 5% occurs in a contiguous area of at least 1% of the detection area of the sensor on the signal-transmissive cover compared to the remaining area of the signal-transmissive cover in the detection area of the sensor.

The invention further relates to a vehicle, in particular a motor vehicle, which is equipped with at least one sensor system according to the invention. The sensor system can be used, for example, in the front, rear or side area of a vehicle, for example in the bumper, radiator grille, headlights, front panel, rear panel, rear light, roof pillar, screen or attachment, such as exterior mirrors. The sensor system can be installed in an opening of a body outer part. Preferably, the sensor system is seamlessly integrated into the surface of the vehicle body part. Particularly preferably, the outer body part is also the sensor protection cover at the same time. The positioning of the sensors behind body components has several advantages over free-standing sensors, especially aesthetic, aerodynamic and repair advantages. Sensor systems with a so-called ADAS (=Advanced Driver Assistance Systems) are particularly suitable for consideration. These are, for example, lidar sensors, scanning lidar sensors, flash lidar sensors, GHz, and THz radars for near-field to remote field detection, cameras for the visible or infrared wavelength spectrum. A possible preferred application is 360° surround detection for highly automated and autonomous driving. Another application area: These ADAS sensors can provide relevant comfort functions for the end customer, for example mechatronic comfort functions such as systems for contact-free opening and closing of doors and tailgates, or for example light-based and display-based comfort functions.

The invention relates in particular to the following embodiments:

According to a first embodiment, the invention relates to a sensor system 200, 300, 400 for a vehicle, in particular a motor vehicle, comprising a sensor housing and an active or passive sensor 102 arranged therein and held on a movable sensor holder 201, 401 with sensor technology based on radiation detection as well as a measuring device associated with the sensor 102 and a control device, coupled to said measuring device, for the sensor holder 201, 401, wherein the sensor housing has a signal-transmissive cover 106, 301 for the sensor 102 on its side located in the detection direction of the sensor 102 and wherein the detection area 108, 109 of the sensor 102 in the area of the signal-transmissive cover 106, 301 has a smaller extent than the signal-transmissive cover 106, 301, wherein the sensor system 200, 300, 400 is characterized in that the measuring device is designed in such a way that it is suitable to check in the detection area of the sensor 102 whether and in which section the signal-transmissive cover 106, 301 has an area with reduced signal transmissivity 202, wherein the measuring device cooperates with the control device in such a way that the control device can change the position of the sensor 102 in such a way that the area with reduced signal transmissivity 202 is outside the detection area 108, 109 of the sensor 102.

According to a second embodiment, the invention relates to a sensor system according to embodiment 1, characterized in that the sensor 102 is selected from radar sensors, light sensors, in particular lidar sensors based on lasers or light-emitting diodes and image acquisition sensors.

According to a third embodiment, the invention relates to a sensor system according to embodiment 1 or 2, characterized in that the sensor 102 has a transmitting device and a separate receiving device, wherein the transmitting device and/or the receiving device is fixed to the movable sensor holder 201, 401 or the transmitting device and the receiving device are each separately fixed to movable sensor holders 201, 401.

According to a fourth embodiment, the invention relates to a sensor system according to one of the preceding embodiments, characterized in that the sensor holder 201, 401 is designed to be movable in all spatial directions, and rotatable and/or tiltable about all axes.

According to a fifth embodiment, the invention relates to a sensor system according to one of the preceding embodiments, characterized in that the sensor holder 201, 401 is assigned at least an electric motor, a piezoelectric element, or a hydraulic element for the movement thereof.

According to a sixth embodiment, the invention relates to a sensor system according to one of the preceding embodiments, characterized in that the sensor holder 201, 401 is fixed to the sensor housing, in particular on the area of the sensor housing opposite from the signal-transmissive cover 106, 301.

According to a seventh embodiment, the invention relates to a sensor system according to one of the preceding embodiments, characterized in that the check of whether and in which section the signal-transmissive cover 106, 301 has an area with reduced signal transmissivity 202 can be carried out by means of a computing unit assigned to the measuring device.

According to an eighth embodiment, the invention relates to a sensor system according to embodiment 7, characterized in that the computing unit can be operated with a data processing program, by means of which the check of whether and in which section the signal-transmissive cover 106, 301 has an area with reduced signal transmissivity 202 is carried out by differential image detection using the same sensor 102 or different sensors, wherein sensor fusion is used in particular when using different sensors.

According to a ninth embodiment, the invention relates to a sensor system according to one of the preceding embodiments, characterized in that the measuring device and the control device are positioned independently of each other inside or outside the sensor housing.

According to a tenth embodiment, the invention relates to a sensor system according to one of the preceding embodiments, characterized in that the measuring device is designed in such a way that it can output an error signal in the event that the position of the sensor 102 cannot be changed in such a way that the area with reduced signal transmissivity 202 is outside the detection area 108, 109 of the sensor 102.

According to an eleventh embodiment, the invention relates to a sensor system according to one of the preceding embodiments, characterized in that the sensor system 200, 300, 400 is designed in such a way that the check of whether and in which section the signal-transmissive cover 106, 301 has an area with reduced signal transmissivity 202 can be carried out on switching on the sensor system 200, 300, 400 and/or at freely selectable time intervals.

According to a twelfth embodiment, the invention relates to a sensor system according to one of the preceding embodiments, characterized in that a signal-transmissive inner protective cover 302 which preferably extends to the lateral inner walls of the housing cover is provided between the sensor 102 and the signal-transmissive cover 106, 301.

According to a thirteenth embodiment, the invention relates to a sensor system according to one of the preceding embodiments, characterized in that the signal-transmissive cover 106, 301 and/or the signal-transmissive inner protective cover 302 is/are constructed of a transparent plastic or glass, wherein the transparent plastic is in particular selected from polycarbonate, polymethyl methacrylate, polyethylene terephthalate, cellulose triacetate, amorphous polyamide, cycloolefin polymer, cycloolefin copolymer, polyethylene, polypropylene, polyvinyl alcohol or from mixtures or copolymers of these, wherein the transparent plastic is preferably polycarbonate or polymethyl methacrylate.

According to a fourteenth embodiment, the invention relates to a method for operating a sensor system 200, 300, 400 for a motor vehicle comprising a sensor housing and an active or passive sensor 102 arranged therein and held on a movable sensor holder 201, 401 with sensor technology based on radiation detection as well as a measuring device associated with the sensor 102 and a control device, coupled to said measuring device, for the sensor holder 201, 401, wherein the sensor housing has a signal-transmissive cover 106, 301 for the sensor 102 on its side located in the detection direction of the sensor 102 and wherein the detection area 108, 109 of the sensor 102 in the area of the signal-transmissive cover 106, 301 has a smaller extent than the signal-transmissive cover 106, 301, wherein the method is characterized in that the measuring device is used to check whether and in which section of the detection area 108, 109 of the sensor 102 the signal-transmissive cover 106, 301 has an area with reduced signal transmissivity 202, and if an area with reduced signal transmissivity 202 is detected, the position of the sensor 102 is changed by means of the control device in such a way that the area with reduced signal transmissivity 202 is outside the detection area 108, 109 of the sensor 102.

According to an fifteenth embodiment, the invention relates to a method according to embodiment 14, characterized in that an area with reduced signal transmissivity 202 is defined in that attenuation of the signal to be detected by the sensor technology of at least 5% occurs in a contiguous area of at least 1% of the detection area 108, 109 of the sensor 102 on the signal-transmissive cover 106, 301 compared to the remaining area of the signal-transmissive cover 106, 301 in the detection area 108, 109 of the sensor 102.

According to a sixteenth embodiment, the invention relates to a vehicle, in particular a motor vehicle, which is equipped with at least one sensor system 200, 300, 400 according to one of the embodiments 1 to 13.

BRIEF DESCRIPTION OF DRAWINGS

The invention is explained in more detail based on FIGS. 1 to 4. In the figures.

FIG. 3 shows another embodiment according to the invention as in FIG. 2 with two signal-transmissive covers;

FIGS. 3a and 3b show a development of the embodiment shown in FIGS. 2a and 2b. The main difference is that the sensor system 300 shown here additionally has, as well as a signal-transmissive cover 301, a signal-transmissive inner protective cover 302.

Figure 1:
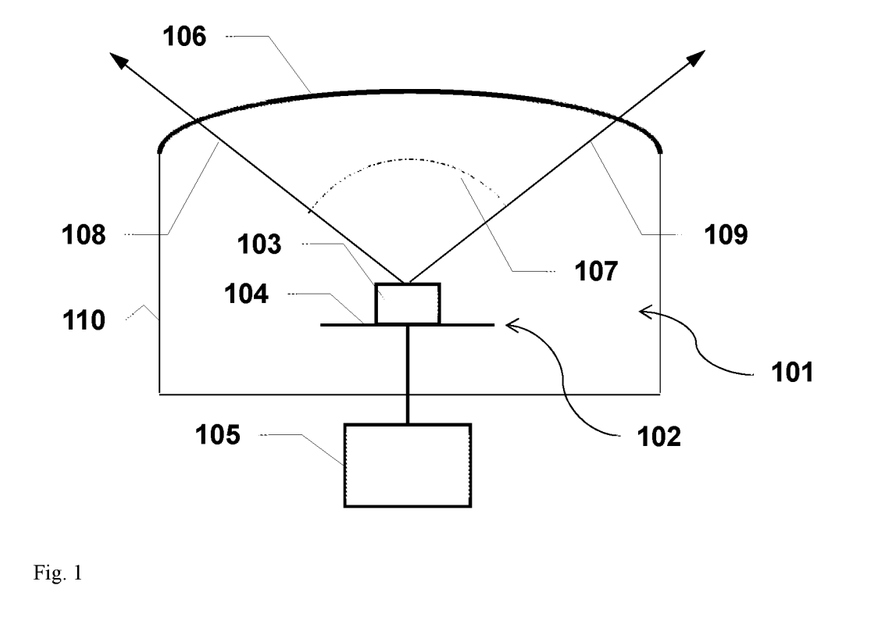
FIG. 1 shows a schematic sensor structure according to the prior art.

In FIG. 1, a sensor system 101 for a motor vehicle is schematically shown in a lateral sectional representation. The sensor system 101 is a parking sensor. The sensor system 101 comprises a sensor housing 110 and a sensor 102 arranged therein consisting of a transmitter 103 and a receiver 104 with a detection angle 107 which is defined by the detection area 108, 109. The sensor 102 is designed in the present case as a lidar sensor. A measuring device 105 is assigned to the sensor 102 for processing the sensor signals. The sensor housing 110 has a signal-transmissive cover 106 for the sensor 102 on its side located in the detection direction of the sensor.

Figure 2A:
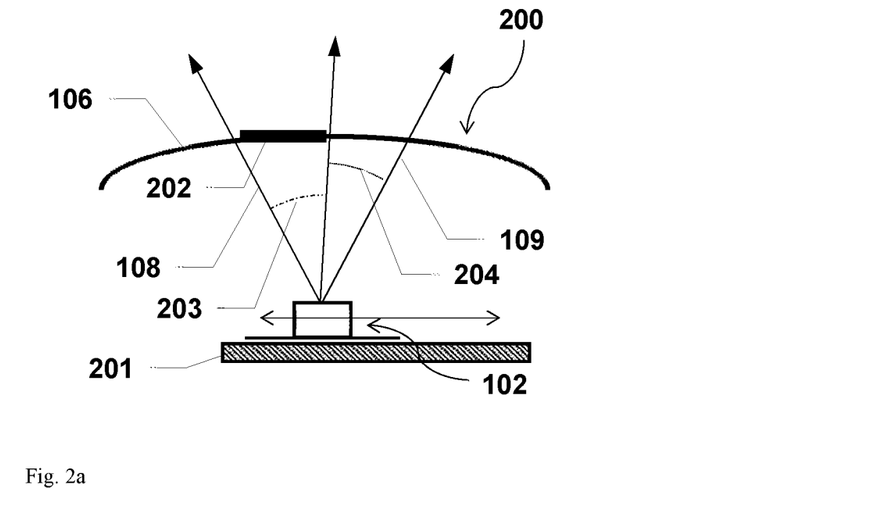
FIG. 2 shows a sensor according to the invention with a moving device in two positions, (2a) distorted sensor signal, (2b) undistorted sensor signal after correction of the position of the transmitter and receiver.
Figure 2B:
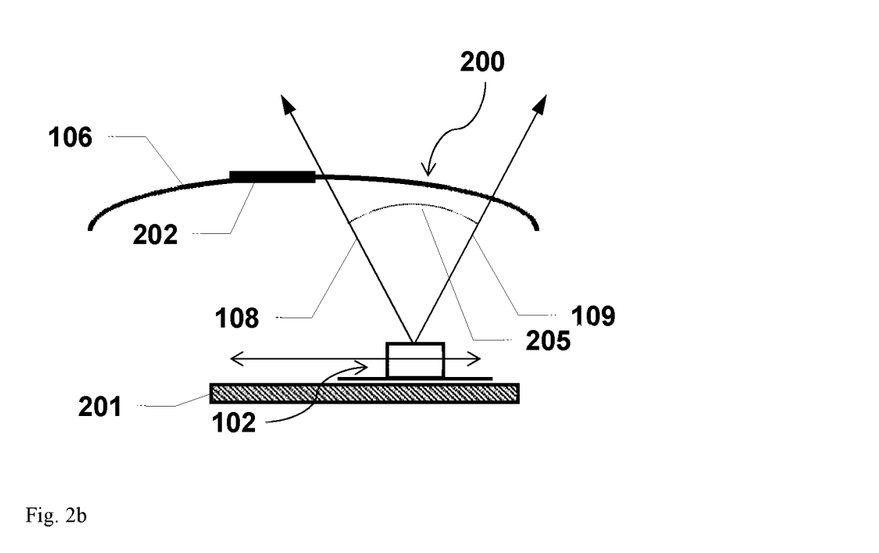

FIG. 2a depicts a sensor system 200 according to the invention. This includes a horizontally movable sensor holder 201 with which the position of the sensor 102 can be changed parallel to the surface of the rear wall of the sensor system 200 as soon as signal-impairing damage 202 is detected on the signal-transmissive cover 106, which affects a first subsection 203 of the detection area 108, 109 of the sensor 102, so that the sensor 102 can only send or receive signals in a second subsection 204. In FIG. 2b the sensor system 200 from FIG. 2a is shown after the sensor 102 has been moved horizontally into such an area in which the damage 202 is outside the detection area 108, 109 of the sensor 102 and the sensor 102 is thus functional again over its entire detection angle 205.

Figure 3A:
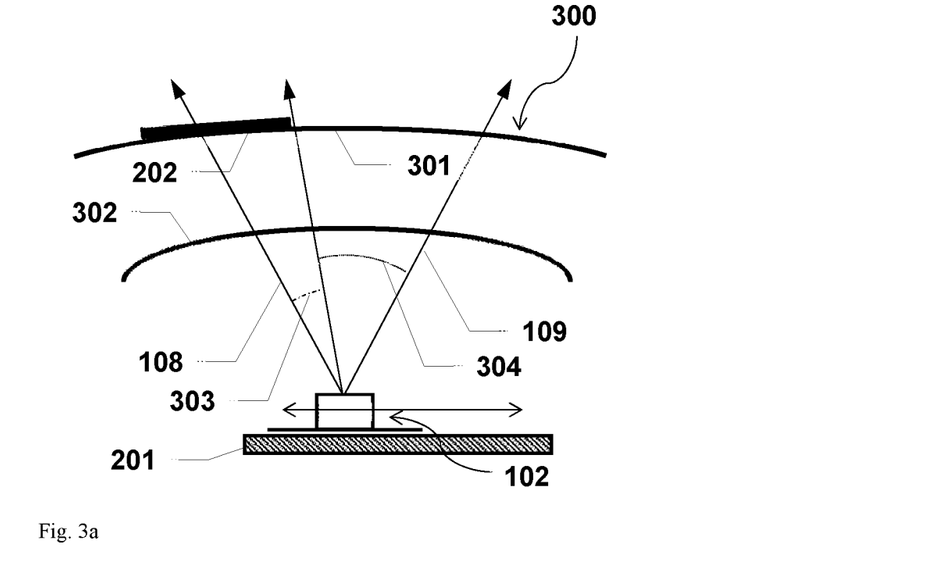
Figure 3B:
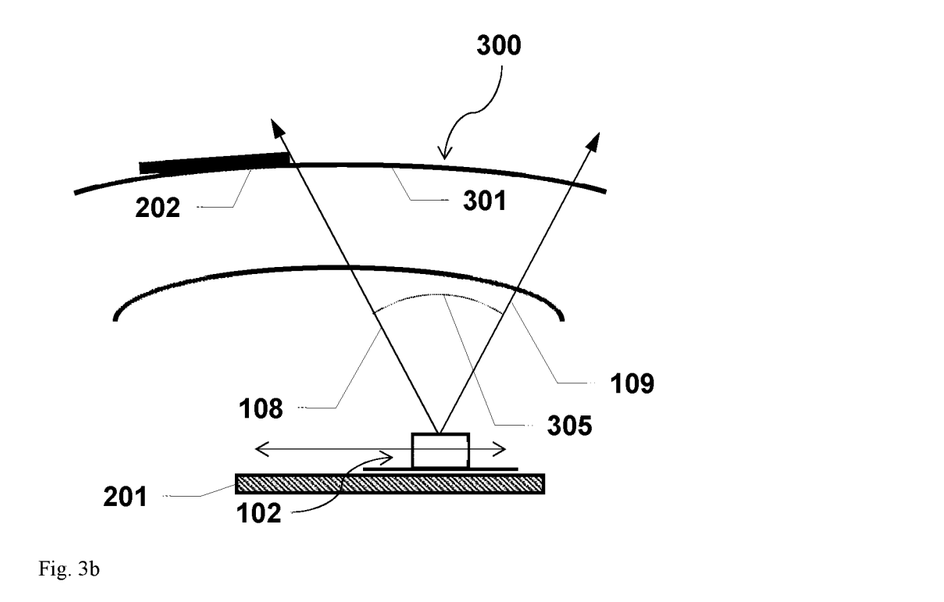

FIGS. 3a and 3b show a development of the embodiment shown in FIGS. 2a and 2b. The main difference is that the sensor system 300 shown here additionally has, as well as a signal-transmissive cover 301, a signal-transmissive inner protective cover 302, which are each made of polycarbonate.

Figure 4A:
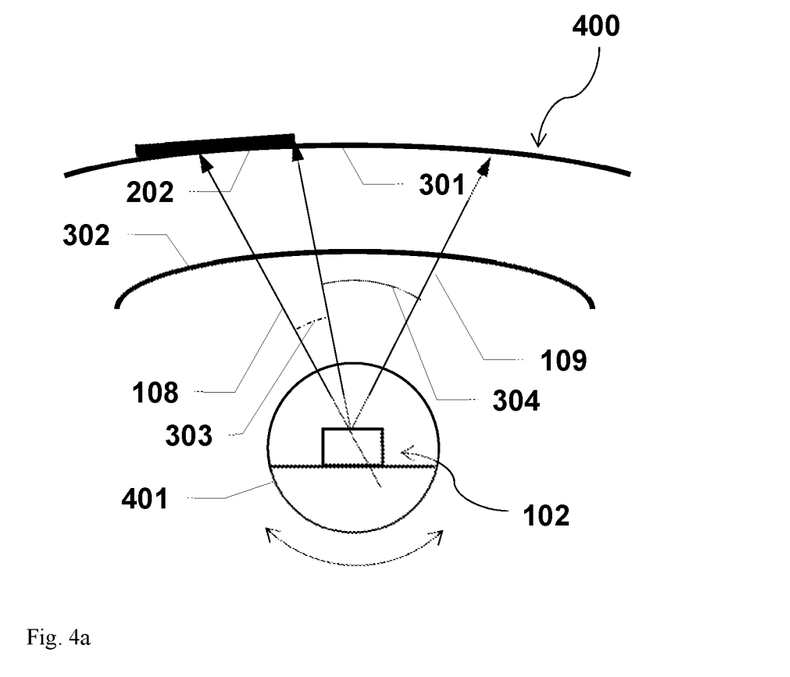
FIG. 4 shows another embodiment according to the invention with a rotation device in two positions, (4a) distorted sensor signal, (4b) undistorted sensor signal after rotation of the transmitter and receiver.
Figure 4B:
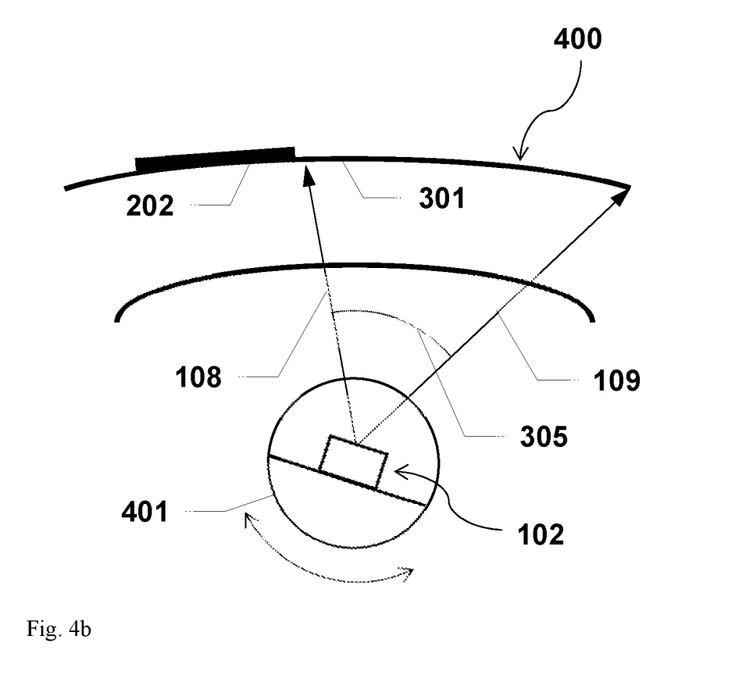

In FIGS. 4a and 4b, a further embodiment of the sensor system 400 according to the invention is depicted. The sensor system 400 also additionally has, as well as a signal-transmissive cover 301, a signal-transmissive inner protective cover 302. In the case of the embodiment shown here, the sensor 102 is fixed to a sensor holder designed as a rotation device 401, with which the sensor 102 can be tilted about one or two spatial axes. As a result, in the case where damage 202 occurs on the signal-transmissive cover 301, the sensor 102 can be tilted in such a way that its detection area 108, 109 is moved past the damage 202 and the sensor 102 is consequently functional again over its entire detection angle 305.

REFERENCE CHARACTER LIST 101 sensor system (prior art)
102 sensor
103 transmitter
104 receiver
105 measuring device
106 signal-transmissive cover
107 detection angle
108 detection area
109 detection area
110 sensor housing
200 sensor system (invention)

201 horizontally movable sensor holder
202 signal-impairing damage
203 first subsection
204 second subsection
205 detection angle
300 sensor system (invention)
301 signal-transmissive cover
302 signal-transmissive inner protective cover
305 detection angle
400 sensor system (invention)
401 sensor holder configured as a rotation device

The invention claimed is:

1. A method for operating a sensor system for a motor vehicle comprising a sensor housing and an active or passive sensor arranged therein and held on a movable sensor holder with sensor technology based on radiation detection as well as a measuring device associated with the sensor and a control device, coupled to said measuring device, for the sensor holder,
   wherein the sensor housing has a signal-transmissive cover for the sensor on its side located in the detection direction of the sensor and wherein the detection area of the sensor in the area of the signal-transmissive cover has a smaller extent than the signal-transmissive cover,
   wherein the measuring device is used to check whether and in which section of the detection area of the sensor the signal-transmissive cover has an area with reduced signal transmissivity, and if an area with reduced signal transmissivity is detected, the position of the sensor is changed by means of the control device in such a way that the area with reduced signal transmissivity is outside the detection area of the sensor and,
   wherein an area with reduced signal transmissivity is defined in that attenuation of the signal to be detected by the sensor technology of at least 5% occurs in a contiguous area of at least 1% of the detection area of the sensor on the signal-transmissive cover compared to the remaining area of the signal-transmissive cover in the detection area of the sensor.

2. The method of claim 1, wherein the sensor is selected from radar sensors, light sensors, lidar sensors based on lasers or light-emitting diodes and image acquisition sensors.

3. The method of claim 1, wherein the signal-transmissive cover or the signal-transmissive inner protective cover is constructed of a transparent plastic or glass.

4. The method of claim 3, wherein the transparent plastic is selected from polycarbonate, polymethyl methacrylate, polyethylene terephthalate, cellulose triacetate, amorphous polyamide, cycloolefin polymer, cycloolefin copolymer, polyethylene, polypropylene, polyvinyl alcohol or from mixtures or copolymers of these.

* * * * *